US008516091B2

(12) United States Patent
Savu et al.

(10) Patent No.: US 8,516,091 B2
(45) Date of Patent: Aug. 20, 2013

(54) MASS CONFIGURING TECHNICAL SYSTEMS

(75) Inventors: Constantin Savu, Antibes (FR); Emmanuel Turci, Antibes (FR)

(73) Assignee: SAP AG, Walldorf (DE)

( * ) Notice: Subject to any disclaimer, the term of this patent is extended or adjusted under 35 U.S.C. 154(b) by 137 days.

(21) Appl. No.: 12/885,850

(22) Filed: Sep. 20, 2010

(65) Prior Publication Data

US 2012/0072553 A1 Mar. 22, 2012

(51) Int. Cl.
 *G06F 15/16* (2006.01)
(52) U.S. Cl.
 USPC .......................................... 709/221; 709/220
(58) Field of Classification Search
 None
 See application file for complete search history.

(56) References Cited

U.S. PATENT DOCUMENTS

2004/0049566 A1* 3/2004 Mattila et al. ................. 709/223

OTHER PUBLICATIONS

"White Paper: SAP Solution Manager 7.0, Service Desk WebService API" published May 2009.*
"SAP Solution Manager Service Desk", copyright 2008.*
Fan, Michael. "Base IMG Configuration Settings for Pre-Configured SAP Student Lifecycle Management (ERP 6—EHP 3)." SAP AG, Oct. 31, 2007, 45 pages.
Krishnan, Madhusudhanan. "ESS & MSS Role—A step by step SPRO Configuration Document." SAP AG, Dec. 2009, 12 pages.
Steuer, Tim. "SAP Solution Manager." SAP AG, 2009, 24 pages.
Kande, Ajay. "Solution Manager 7.0 Ehp1 Initial/Basis Configuration." SAP AG, Feb. 2009, 24 pages.
'SAP Solution Manager: The New Support Infrastructure for Implementing and Operating Your SAP Solution' [online]. SAP, 2003, [retrieved on Sep. 17, 2010]. Retrieved from the Internet: <URL: http://www.sap.com/services/pdf/BWP_SolutionManager.pdf>, 4 pages.
SAP AG, "Budget Control System, Basic Configuration Public Sector (PS1)," *SAP Best Practices: Building Block Configuration Guide*, 2007, 61 pages.
SAP, "SAP Enterprise Support: SAP Solution Manager Enterprise Edition," *SAP Solution Manager Product Management*, 2008, 107 pages.
'Solution Manager System Copy ABAP+JAVA Windows' [online]. SAP AG, 2009, [retrieved on Sep. 17, 2010]. Retrieved from the Internet: <URL: http://www.sdn.sap.com/irj/scn/go/portal/prtroot/docs/library/uuid/5019eaab-afdd-2c10-61a1-ac50f784c0fe?QuickLink=index&overridelayout=true>, 22 pages.

* cited by examiner

*Primary Examiner* — Scott Christensen
(74) *Attorney, Agent, or Firm* — Fish & Richardson P.C.

(57) ABSTRACT

A computer-implemented method for mass configuring technical systems includes receiving a call that is associated with a configuration manager and generated from a first of multiple systems. Each of the multiple systems has at least one instance of the configuration manager, and each system includes multiple technical systems configured using a corresponding instance of the configuration manager. The method includes retrieving, from the corresponding instance and in response to the call, identifiers for at least a subset of the technical systems in the first system. The method includes retrieving, from the corresponding instance and from the subset of the technical systems, configurations for the subset of the technical systems. The method includes forwarding an execute configuration communication to the corresponding instance including at least one parameter that has been changed from the retrieved configurations.

21 Claims, 16 Drawing Sheets

```
- <Configuration>                                              ⎫
                                                               ⎬ 1402        ← 1400
  - <SystemList>                                               ⎭
    - <item>
        <Lid>SD7</Lid><                                        ⎫
        <Type>ABAP</Type>                                      ⎬ 1404
        <ActivitiesExecutionMode>ALL</ActivitiesExecutionMode>
        <ExecutionMode>Re-execute</ExecutionMode>
      - <Activity>                                                                          ⎫
        - <item>
            <ActivityId>DIAG_MNGD_PRERQ_CHK</ActivityId>
            <Name>Check of the Diagnostics Prerequisites</Name>
            <ShortDescription>Diagnostics Prerequisites</ShortDescription>
            <Type>A</Type>
            <StepId>AGS_MS_CHECK_PREQ</StepId>              ⎫
            <StepShortdEscription>Check                     ⎬ 1406A          ⎬ 1406
              Prerequisites</StepShortdEscription>          ⎭
            <ExecutionStatus />
            <ActivityParameters />
            <LastChangedBy>PRAT</LastChangedBy>
            <LastChangedDate>20100628144911</LastChangedDate>
            <Status>Successful</Status>
            <UpdateNeeded>X</UpdateNeeded>                                                  ⎭
        </item>
        - <item>
        - <item>
            <ActivityId>AGS_MNGD_RFC</ActivityId>
            <Name>Creation of RFC Connection</Name>
            <ShortDescription>RFC Connection</ShortDescription>
            <Type>C</Type>
            <StepId>AGS_MS_GEN_RFC</StepId>                 ⎫
            <StepShortdEscription>Connect Managed           ⎬ 1408A
              System</StepShortdEscription>                 ⎭
            <ExecutionStatus />
          - <ActivityParameters>
            - <item>
```

FIG. 14  Ⓐ

MASS CONFIGURING TECHNICAL SYSTEMS

TECHNICAL FIELD

This document relates to mass configuring technical systems.

BACKGROUND

Enterprise resource planning (ERP) systems require complex configurations. Typically, an ERP system includes a large number of components or modules, sometimes referred to as technical systems. The number of technical systems in some instances depends on how much or how little of the ERP software manufacturer's solution the customer chooses to implement. Each technical systems can represent one or more ERP aspects, for example customer relationship management (CRM) functions. Each technical system includes software and can be implemented on one or more physical devices, such as servers.

One example of an ERP system is manufactured by SAP AG. There, a component called Solution Manager is used at the customer's system to configure any and all of the SAP technical systems that the customer chooses to implement. Solution Manager provides an interface of at least one display screen for use in configuring each respective technical system. Accordingly, configuration of several technical systems is done sequentially in Solution Manager.

SUMMARY

The invention relates to mass configuring technical systems.

In a first aspect, a computer-implemented method for mass configuring technical systems includes receiving a call that is associated with a configuration manager and generated from a first of multiple systems. Each of the multiple systems has at least one instance of the configuration manager, and each system includes multiple technical systems configured using a corresponding instance of the configuration manager. The method includes retrieving, from the corresponding instance and in response to the call, identifiers for at least a subset of the technical systems in the first system. The method includes retrieving, from the corresponding instance and from the subset of the technical systems, configurations for the subset of the technical systems. The method includes forwarding an execute configuration communication to the corresponding instance including at least one parameter that has been changed from the retrieved configurations.

In a second aspect, a computer program product is tangibly embodied in a computer-readable storage medium and includes instructions that when executed by a processor perform a method for mass configuring technical systems. The method includes receiving a call that is associated with a configuration manager and generated from a first of multiple systems. Each of the multiple systems has at least one instance of the configuration manager, and each system includes multiple technical systems configured using a corresponding instance of the configuration manager. The method includes retrieving, from the corresponding instance and in response to the call, identifiers for at least a subset of the technical systems in the first system. The method includes retrieving, from the corresponding instance and from the subset of the technical systems, configurations for the subset of the technical systems. The method includes forwarding an execute configuration communication to the corresponding instance including at least one parameter that has been changed from the retrieved configurations.

In a third aspect, a system includes at least one processor; and a computer readable medium including instructions that when executed by the processor generate a service. The service includes receiving a call that is associated with a configuration manager and generated from a first of multiple systems each having at least one instance of the configuration manager, each system including multiple technical systems configured using a corresponding instance of the configuration manager. The service includes retrieving, from the corresponding instance and in response to the call, identifiers for at least a subset of the technical systems in the first system. The service includes retrieving, from the corresponding instance and from the subset of the technical systems, configurations for the subset of the technical systems. The service includes forwarding an execute configuration communication to the corresponding instance including at least one parameter that has been changed from the retrieved configurations. Implementations can include any or all of the following features. Each of the systems has defined therein an application for generating a corresponding version of the call. The subset is defined by filtering all technical systems in the first system. Those parameters of the configurations corresponding to custom activities are retrieved from the instance, and wherein others of the parameters of the configurations corresponding to automatic activities are retrieved from respective ones of the subset of the technical systems. A configuration execution status is retrieved from the instance in the first system after forwarding the execute configuration communication. An executed configuration is retrieved from the instance in the first system after forwarding the execute configuration communication. The configurations are retrieved using at least an XML file, and wherein in the execute configuration communication the XML file has been reduced to only the at least one parameter that has been changed. The details of one or more implementations are set forth in the accompanying drawings and the description below. Other features and advantages will be apparent from the description and drawings, and from the claims.

DETAILED DESCRIPTION

Figure 1:
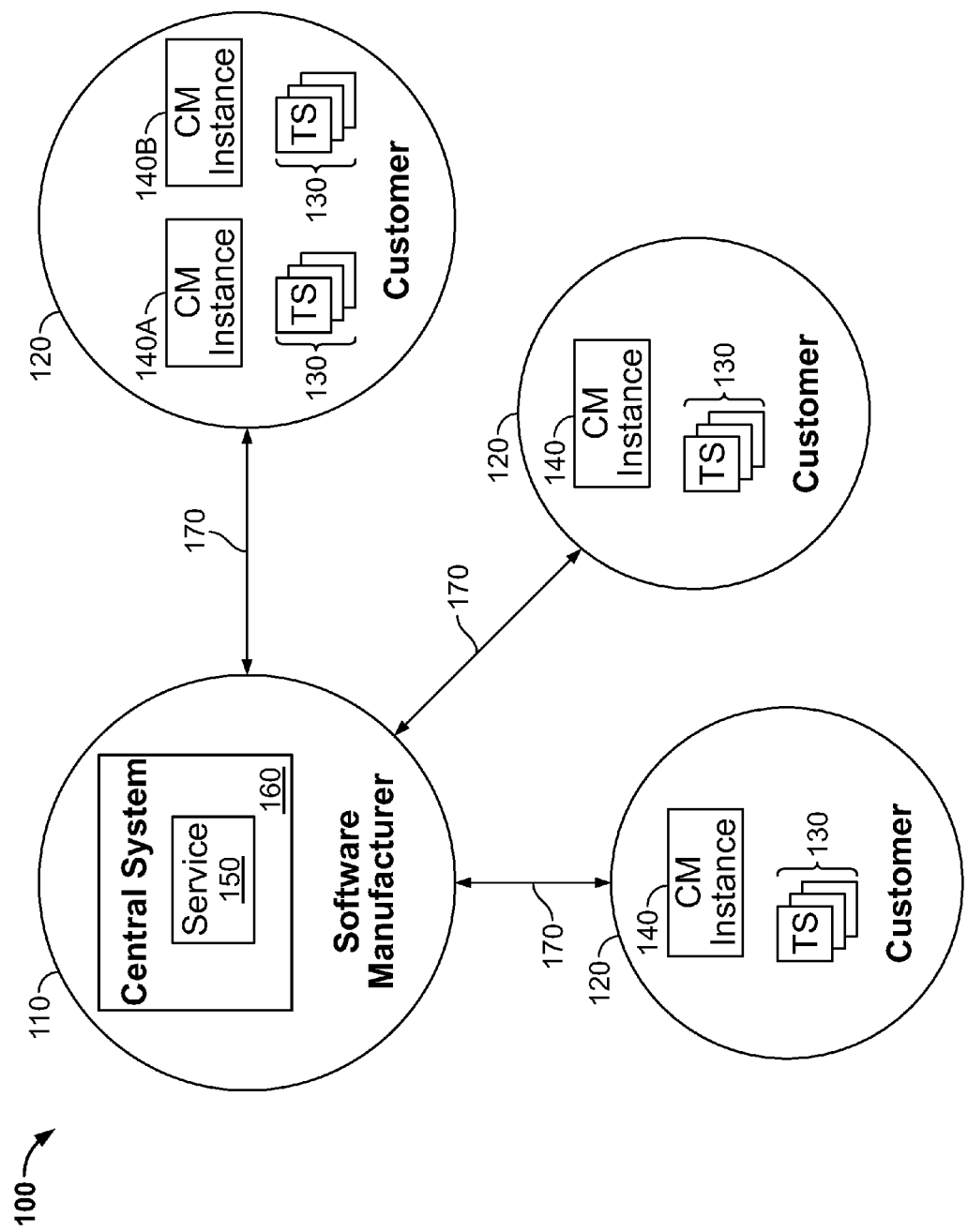
FIG. 1 shows a system where mass configuration of technical systems can be performed.

FIG. 1 shows a system 100 where mass configuration of technical systems can be performed. Here, as schematically illustrated, the system 100 includes a software manufacturer 110 and multiple customers 120. For example, each of the customers 120 has obtained and implemented one or more ERP solutions from the software manufacturer 110. The system 100 can be implemented using any number of devices, such as servers and personal computers, which can communicate with each other using any form of wired or wireless connection, such as by network connection or the internet.

Here, the software manufacturer 110 creates technical systems 130 and delivers one or more of them to each customer. For example, one or more of the technical systems 130 is an ERP solution, such as a CRM system. The software manufacturer 110 also creates and delivers at least one configuration manager (CM) instance 140 for each of the customers. The configuration manager 140 is a software tool that the customer can use to configure any or all of the technical systems 130 for the customer's particular situation and requirements. In some implementations, a customer may have a somewhat more segregated landscape, and the customer might then choose to implement two or more configuration managers 140A and B, each responsible for some of the customer's technical systems. For example, this may be the case when the customer's IT landscape is partitioned into separate geographic regions.

For mass configuration of the technical systems 130, the software manufacturer 110 makes available to the customers 120 a service 150. The software manufacturer can implement the service using any suitable technology, such as in form of a cloud service provided by a central system 160, such as one or more servers, which cloud service is available to each of the customers, for example via the internet. The service can be composed of multiple service providers providing different functionality. In some implementations, the service 150 is referred to as a "web service."

For example, the service 150 may be accessed using a call from a script or other program at the respective customer, which programs can be individualized and tailored to the customer's system. The service 150 can include one or more APIs designed for obtaining, processing and providing the necessary information for mass configuration of the technical systems. The entire interactions between each customer 120 and the service 150 are here illustrated as communications 170. The extent of the communications 170 for an individual customer can vary depending on whether the customer uses all or only some features provided by the service 150. Nevertheless, the service 150 can be used for mass configuring any or all of the technical systems 130 in the customer's landscape—whether they be only a few or many hundreds (or more).

Figure 2:
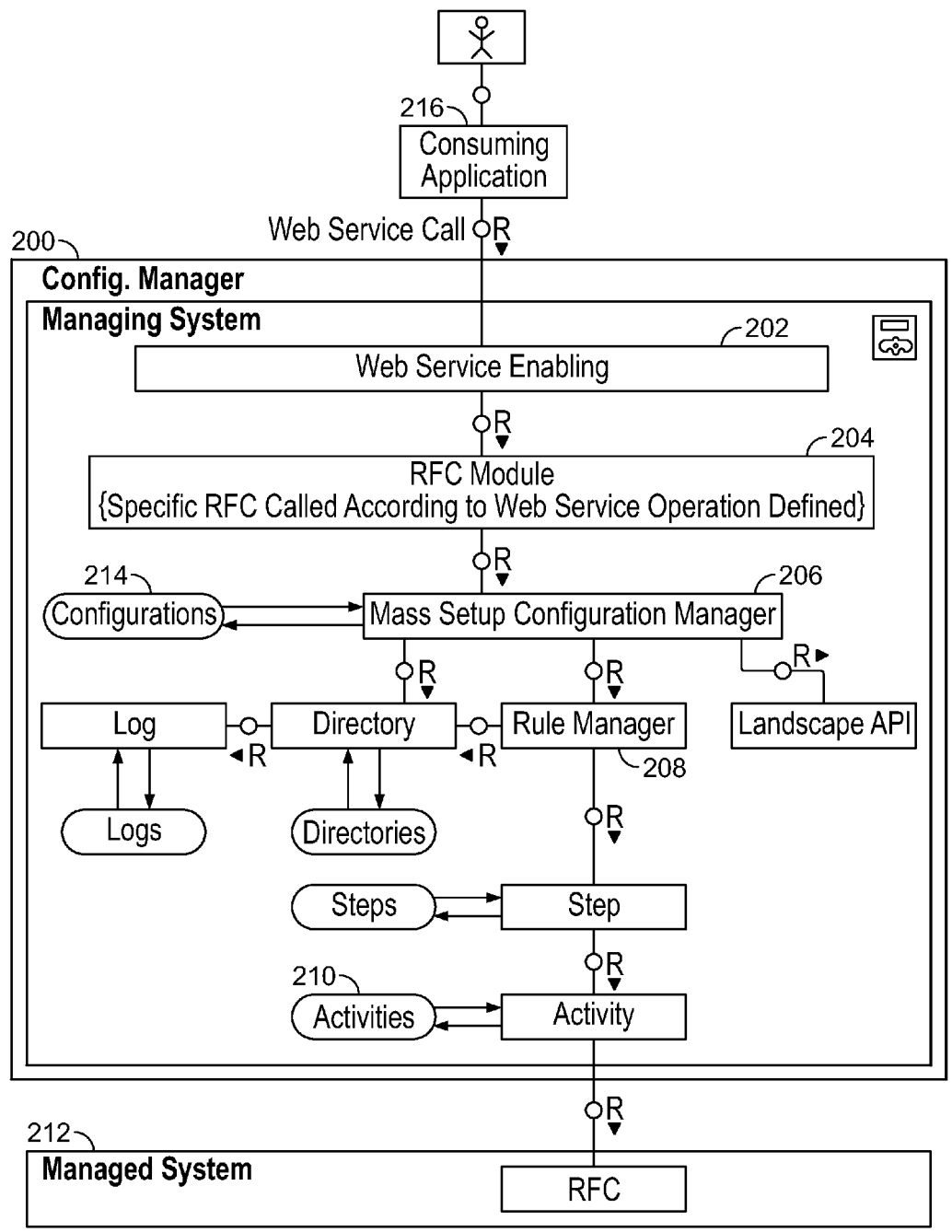
FIG. 2 shows a configuration manager.

FIG. 2 shows a configuration manager 200. A "Web Service Enabling" 202 allows the configuration manager to offer multiple operations which are mapped to specific API(s) in the service 150 (FIG. 1) used to return corresponding data. These operations can include retrieving a list of technical systems or retrieving a configuration template, to name just two examples. The Web Service Enabling 202 also allows automatic transformation of any API export data into any other suitable format, such as an XML based format.

Here, the corresponding API uses a remote-enabled function module, and the configuration manager 200 therefore includes a remote function call (RFC) module 204 configured for making RFCs.

An object 206 called "Mass Setup Configuration Manager" is used in the mass configuration. In some implementations, the object 206 reuses one or more parts of a framework that the configuration manager 200 uses for non-mass configuration, e.g., for configuration of each technical system sequentially. For example, the object 206 uses a "Rule Manager" 208 to retrieve steps according to a managed system configuration scenario defined in the configuration manager 200 and in the corresponding technical system.

The non-mass configuration by the configuration manager 200 can be based on activities 210. The activities can perform the configuration by executing scripts (e.g., via a direct URL call) or by making remote calls to managed systems 212 (i.e., the technical system). Such activities can include checking diagnostics prerequisites or entering system-wide parameters. Likewise, some or all of the activities 210 can be invoked when mass configuration is performed. In some implementations, only activities labeled "automatic" or "custom" are candidates for being used in mass configuration. For example, custom activities are those for which it is the configuration manager 200 that holds a record of the configuration parameters after the configuration. In contrast, automatic activities are those for which the configuration parameters are recorded by individual technical system(s).

The way mass configuration is performed can depend on which operation(s) the service requests. For example, with automatic activities, configuration execution may be performed according to the configuration received from the service. As another example, with custom activities a configuration template can be returned to the service, and the execution can be performed according to data entered in the configuration template that is received back from the service. The object 206 can store all executed configurations into a configuration repository 214, such as in a database.

In operation, the customer employs a consuming application 216, such as any form of script or user interface that is compatible with the service. The relevant technical systems are listed, the configurations retrieved and new ones generated, and the managed system is reconfigured accordingly.

The following is an example how the configuration manager can be used in creating the consuming application 216. First, a http service can be created, such as by a transaction in the configuration manager. In the transaction, a dispatcher is defined for handling (web) service calls. The dispatcher, e.g., a class, will perform the mapping between the (web) service operations and the function modules (e.g., those from non-mass configuration that are reused for mass configuration purposes). Then, the service is attached to a remote call function (RCF) destination, such as by another transaction in the configuration manager. The consuming application can use an HTTP connection to the software manufacturer's system. The host, port and path of the HTTP service can be entered as technical settings.

The function modules of the configuration manager are remote-enabled. Each operation call has a unique name. The dispatcher matches the calls with the corresponding function module by their respective names.

Figure 3:
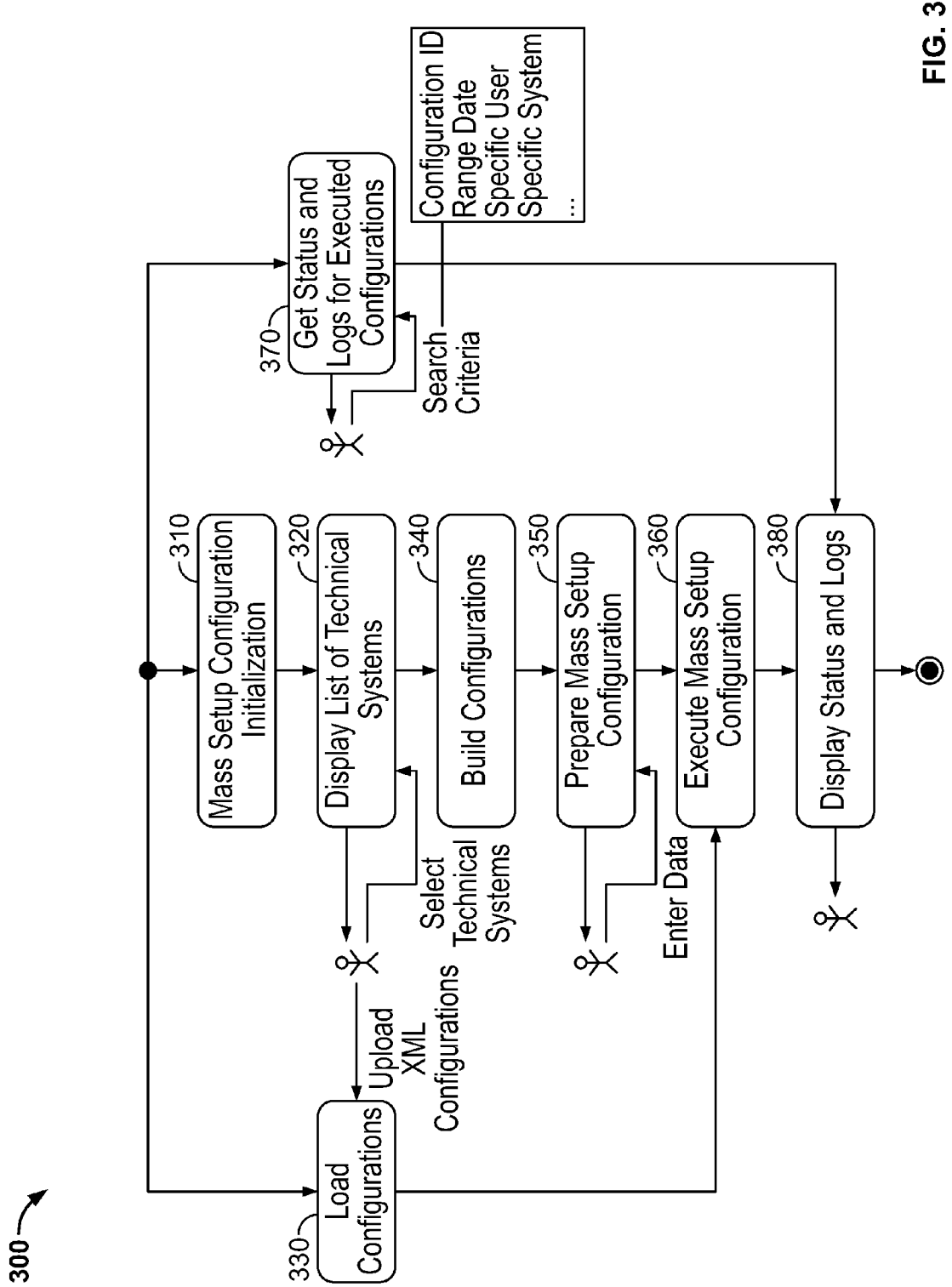
FIG. 3 shows a state diagram for mass configuration of technical systems.

FIG. 3 shows a state diagram 200 for mass configuration of technical systems. In state 310, mass setup configuration is initiated. For example, the mass setup configuration is initialized by a customer using the software manufacturer's service. In state 320, a list of technical systems is displayed. For example, all of the customer's technical systems are listed. As another example, the customer can specify one or more criteria for filtering the list, and after a search of the customer's IT landscape is performed using the criterion or criteria, the filtered list can be displayed. In state 330, configurations for the technical systems are loaded from the customer's system to the service (e.g., to the software manufacturer's system).

In state 340, configurations are built. In some implementations, this involves presenting the retrieved configurations so that they are understandable to the customer. For example, parameters can be displayed in a user interface.

In state 350, mass setup configuration is prepared. In some implementations, the customer enters data and/or makes other modifications in the configurations that were loaded from the customer's system. For example, the customer modifies one or more parameters in the configurations. As another example, the user can delete an existing parameter, or add a parameter that is part of the template configuration but which was not present in the existing configuration. In some implementations, the configuration is built using the same or a similar file(s) as used in retrieving the configurations. Other suitable ways of building configurations can be used.

The service compiles an execute configuration communication and forwards it to the customer's system. The communication instructs the customer's instance of the configuration manager to configure one or more of the customer's technical systems using a configuration that the service provides (i.e., the configuration that the customer has created and wishes to have mass installed). The execute configuration communication is sent asynchronously for all of the systems. This can allow the customer to initiate the mass configuration by a single command (e.g., pressing an "execute" button), and the configurations on the respective technical systems will then be performed in accordance with priority rules of each technical system (e.g., the technical system can have a priority scheme by which critical updates or configurations take precedent over non-critical ones).

In state 360, the mass setup configuration is executed by the customer's instance of the configuration manager. That is, any or all of the customer's technical systems affected by the configuration are now configured using the revised parameter(s). For example, if the parameter is a user name, the customer can enter that data a single time for all the technical systems, and then initiate the execution of the mass configuration to have the user name updated in all designated systems. When the configuration manager performs custom activities, it configures the technical system(s) accordingly and records the parameter(s), but for automatic activities it performs only the configuration, and the technical system stores the parameter(s).

In state 370, the service retrieves status and logs from the customer's configuration manager for the executed configuration. For, example, date stamps or any other parameters regarding the configuration can be logged, and provided when the status is reported. In state 380, the status and logs are displayed. For example, the display can be made using the interface that the customer uses to interact with the service.

Figure 4:
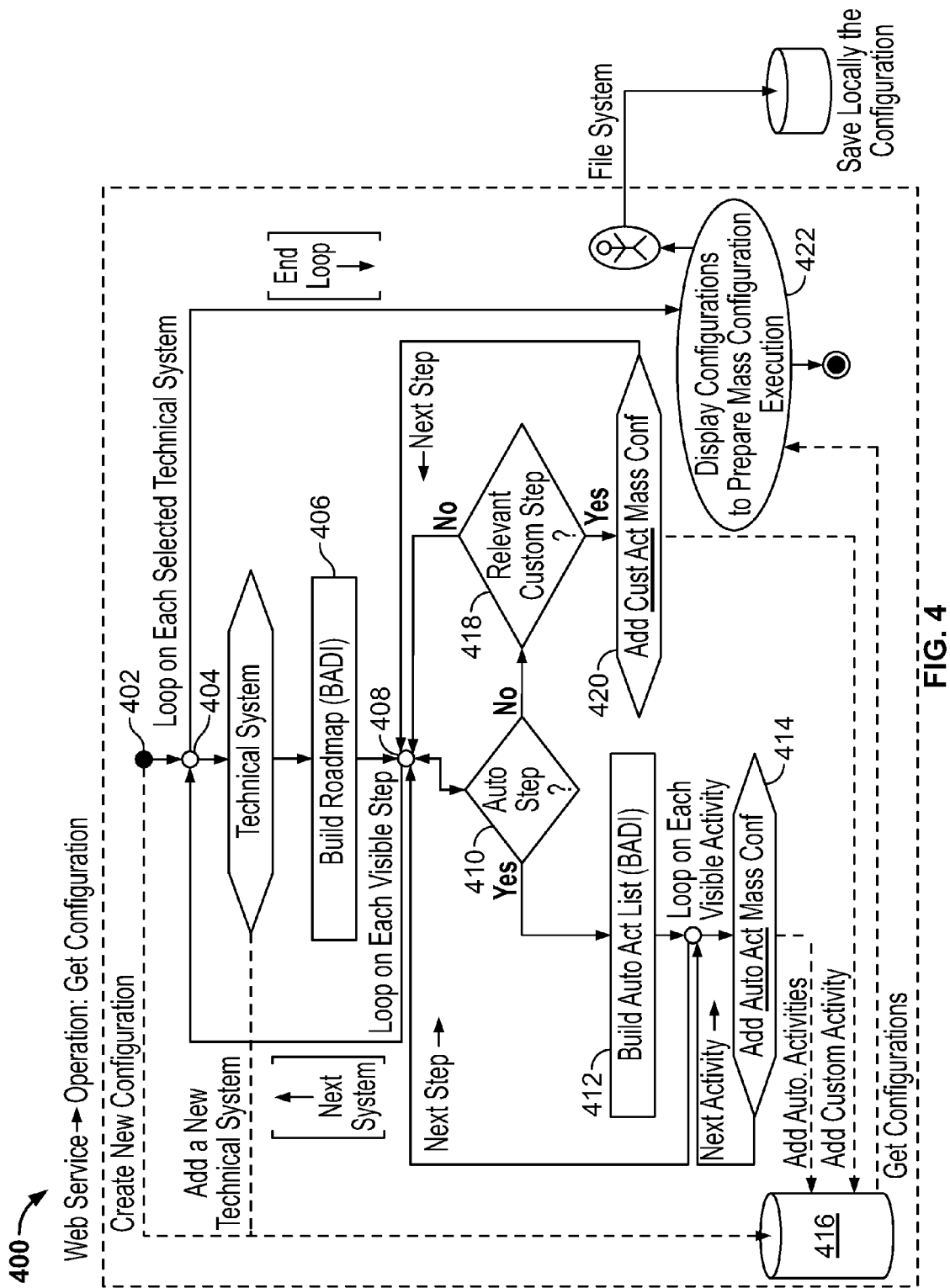
FIG. 4 shows a state diagram for retrieving configurations.

FIG. 4 shows a state diagram 400 for retrieving configurations. At 402, the configuration manager starts building a new configuration template. At 404, a loop is performed on each technical system. For each one, a new technical system configuration is added to the configuration database. In some implementations, the configuration manager in parallel checks whether this technical system has already been configured using a mass setup configuration. If so, an execution mode attribute will be set to "re-execute." Otherwise, the execution mode attribute will be set to "initial."

For each technical system, a list of steps is obtained at 406. For example, the business add-in (BADI) concept of SAP systems can be used to guarantee the validity of each step according to the system type of current technical system. BADIs are based on ABAP objects and facilitate user customization or other modifications at the application layer. A BADI includes a definition, an interface and a class that implements the interface. A loop over each step is initiated at 408.

Depending on the type of each step, the action will be different. At 410, if the step is automatic, the list of all automatic activities is retrieved at 412. For example, the BADI concept can be used to build a list of automatic activities which are valid for the current technical system type. If so, the configuration manager at 414 adds this automatic activity in a configuration database 416.

In contrast, if the step is non-automatic at 410, it is determined at 418 whether the step is a relevant custom step. If so, the corresponding class of related activity is used to retrieve its configuration at 420. In case this custom step not supposed to be in the configuration, the return configuration could be empty. Otherwise, the corresponding configuration is added. If the step is not a relevant custom step at 418, then by definition it is manual. In such situation, no action is performed in the implementation described here. Rather, the state may loop to the next step, if any, at 408. When all steps have been looped through, the state checks at 404 whether any additional technical system remains.

At 422, the complete configuration template is built from the configuration database data. Then this configuration template is returned to the function module in charge of building the output data. An example of an XML file containing a retrieved configuration will be described later.

Figure 5:
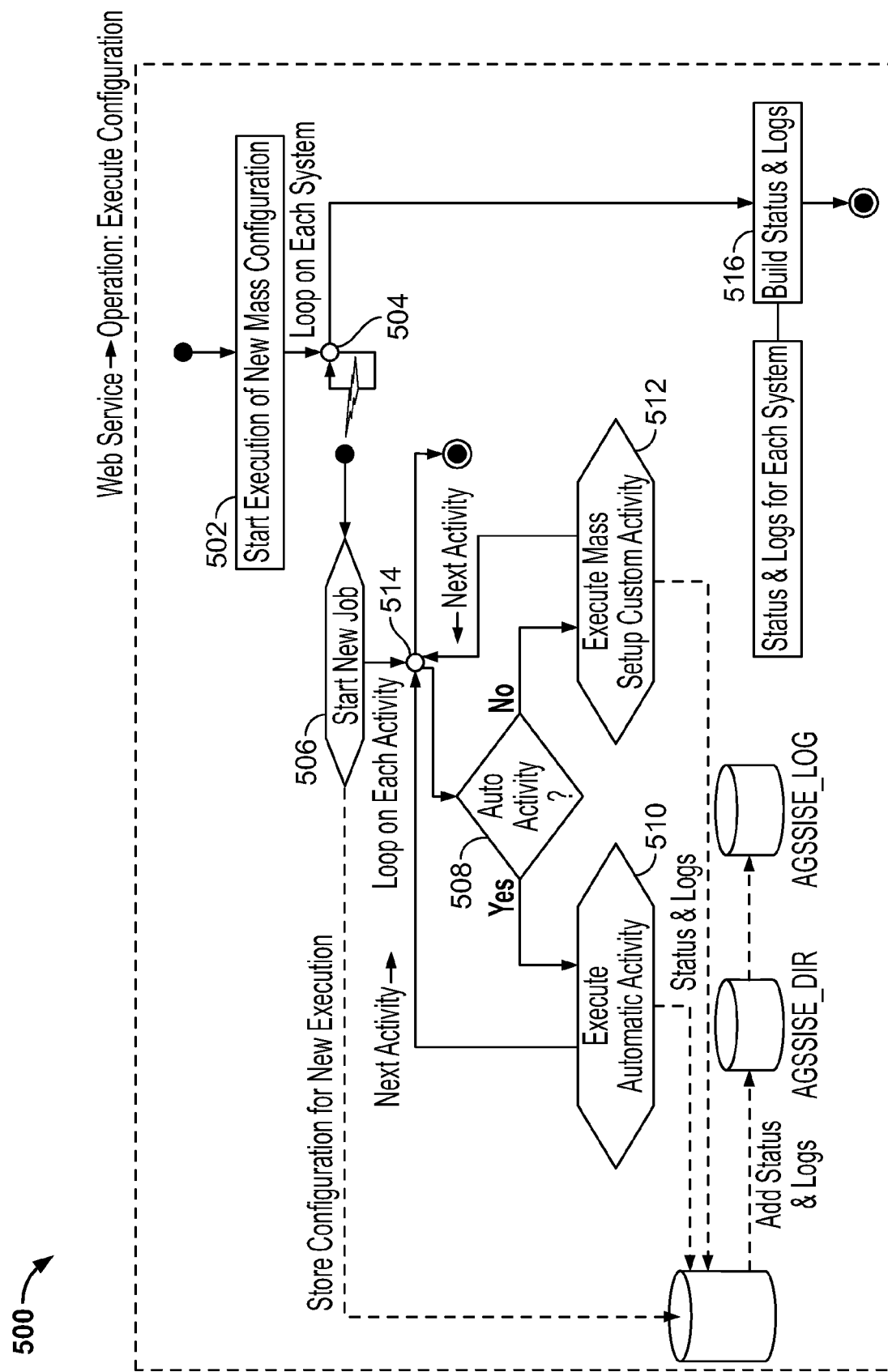
FIG. 5 shows a state diagram for executing a configuration.

FIG. 5 shows a state diagram 500 for executing a configuration. At 502, the configuration manager starts loading the received configuration for execution. At 504, a loop is performed on each technical system affected by the received configuration. At 506, a new job is started to perform system configuration.

In some implementations, it is not possible to execute two configurations in parallel with the same technical system. Therefore, if a job already exists in the configuration storage with the same technical system and if this job is not completed, an error message should be returned. For example, the error message can be added into the return status and logs. If an old job has been completed, then the new one replaces it. If job creation fails, the error message should be filled in the return status and logs accordingly.

When a job is executed, the first step should be to store the complete configuration in the configuration database. Then the execution should continue and at the end the job should set execution status and log messages. Status and logs messages should be returned, for example with a "Get Status and Logs" operation.

In some implementations, a quick configuration can be performed of some technical systems. For example, only automatic activities detected at 508 are executed at 510. In such situations, attributes can be set in the configuration as follows. Execute Automatic Activities Only is set to TRUE. This means that it is not necessary to enter the execution process for each automatic activity. Rather, all activities will be executed as default. Automatic Activities Execution Mode is set to FORCE_ALL|ERROR. FORCE_ALL will execute the whole configuration without taking into account the last execution status. In case of ERROR, however, only activities with error status should be re-executed.

In contrast, for custom activities, mass setup custom activity is executed at 512. After each of 510 and 512, the state loops to the next activity, if any, at 514.

Finally status and logs are returned at 516 to the function module in charge of building the output data.

Figure 6:
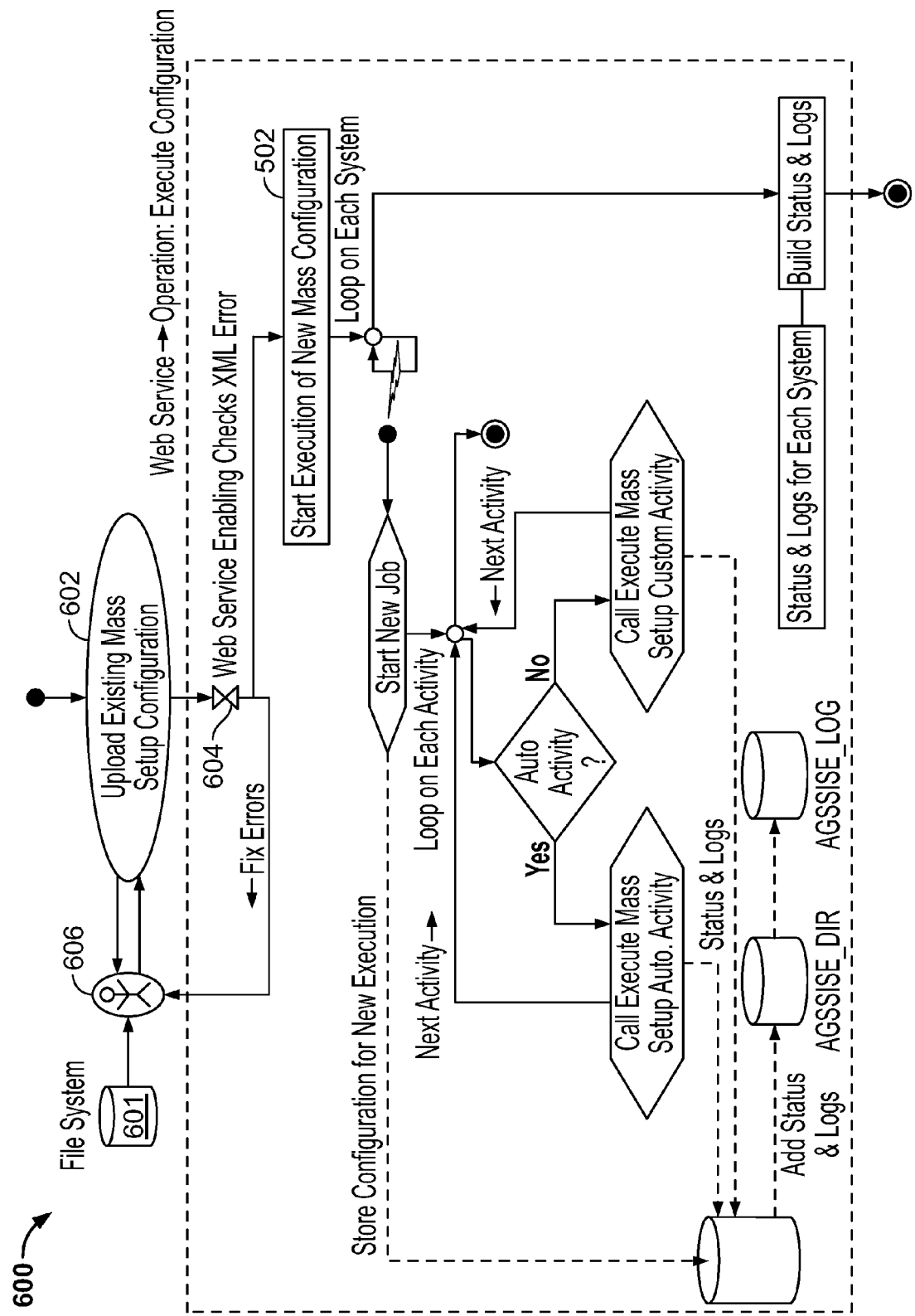
FIG. 6 shows another state diagram for executing an existing configuration uploaded from a file system.

FIG. 6 shows another state diagram 600 for executing an existing configuration uploaded from a file system 601. The execution of the configuration is performed substantially as in the previous example, but the customer here first uploads an existing mass setup configuration from the file system 601 to the service at 602. The existing mass setup configuration can be one that was forwarded to the configuration manager and executed according to the example above. For example, the customer can perform this upload to revert the technical systems' configurations to an earlier mass-implemented state. At 604, checks for XML errors are performed. For example, the Web Service Enabling 202 (FIG. 2) can be used. Any found errors can be fixed at 606, for example by a user. When no errors are found, the execution of the mass setup configuration can be started at 502.

Figure 7:
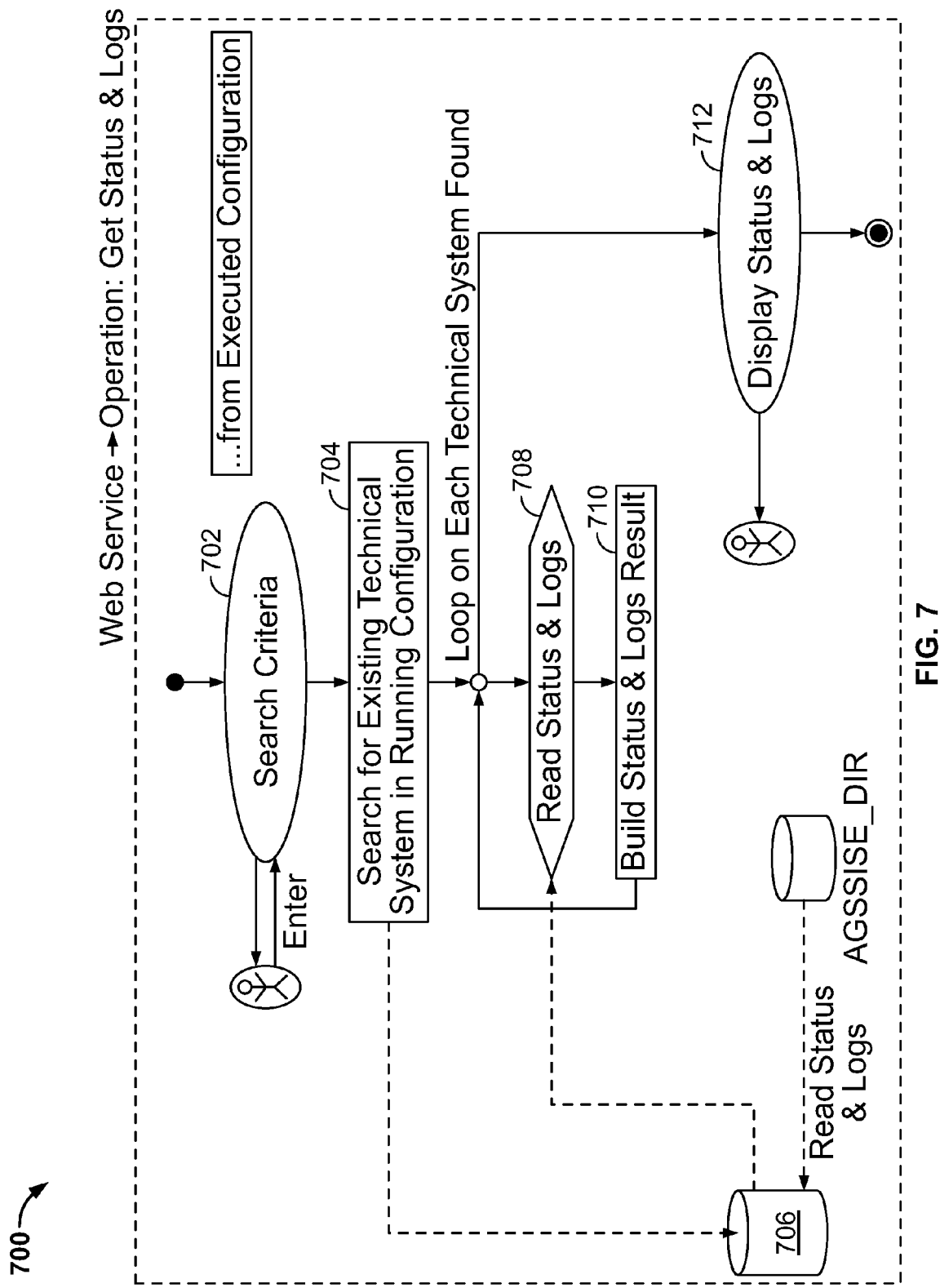
FIG. 7 shows a state diagram for retrieving a status and log.

FIG. 7 shows a state diagram 700 for retrieving a status and log. At 702, one or more search criteria are defined. In some implementations, the search criteria can focus on the configuration being sought. For example, the search can be performed by a configuration identifier, by date when executed, by the user initiating the configuration, or by a combination of some or all of these attributes.

In some implementations, the search criteria can focus on the technical systems being sought. For example, the search can be performed by the technical system name, by system type, or by a combination of these attributes.

The search is performed at 704. The configuration manager searches a configuration database 706 for all technical systems already executed. Statuses and logs are read at 708. At 710, all statuses retrieved for the technical systems are consolidated. For example, for each technical system a list of steps and activities which belong to the technical system is built, and then all statuses are consolidated.

Finally status and logs are returned at 712 to the function module in charge of building the output data.

Figure 8:
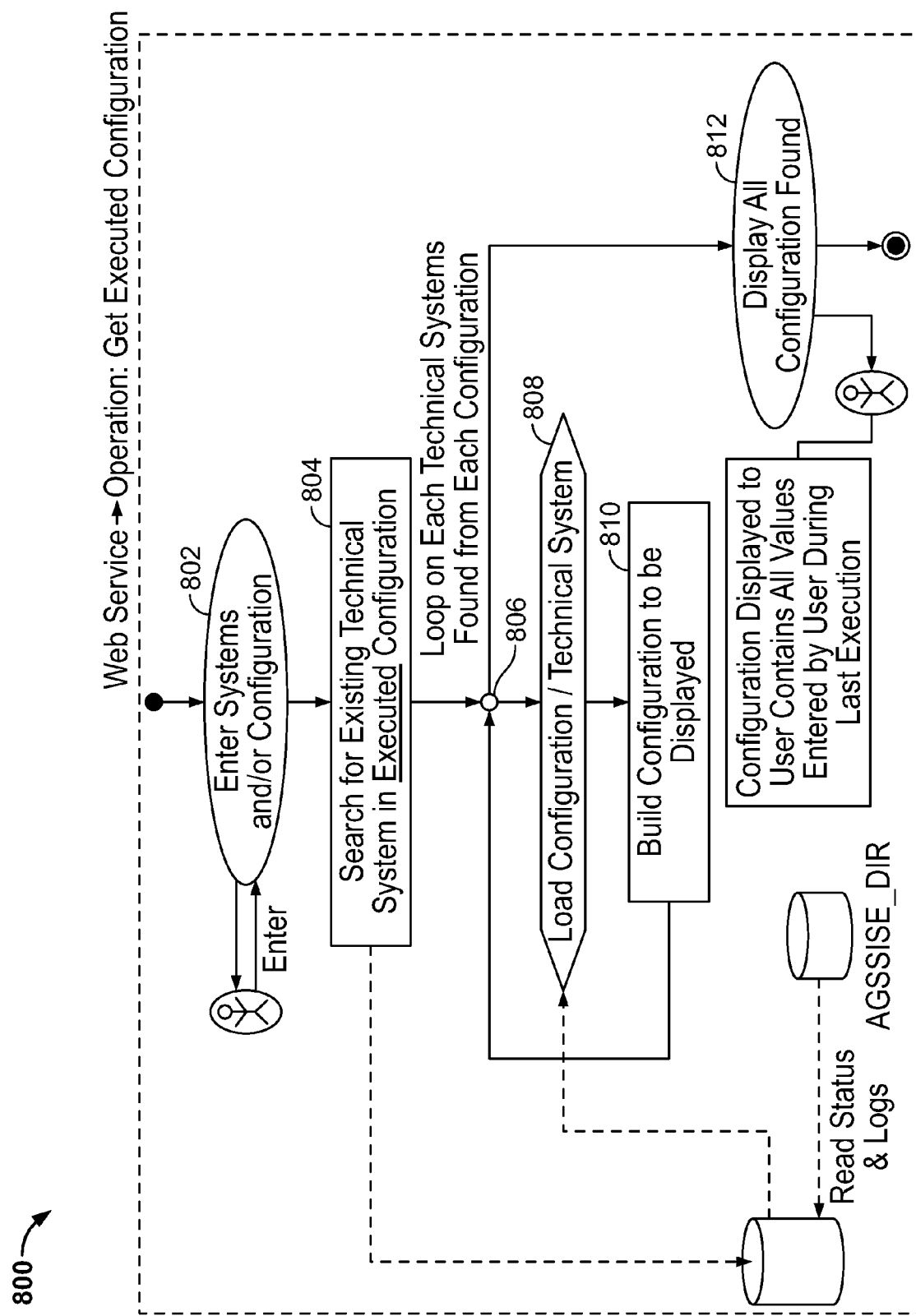
FIG. 8 shows a state diagram for retrieving an executed configuration.

FIG. 8 shows a state diagram 800 for retrieving an executed configuration. In some implementations, the main use of this operation is to retrieve the last executed configuration for any technical system, for example to re-execute such configuration. Before the configuration is re-executed, one or more parameters can be changed, deleted or added.

At 802, one or more search criteria are entered. For example, the configuration manager can be instructed to search among all configurations in the configuration database based on input parameter(s), or based on technical system(s), or both. The search is performed at 804. Then all configurations found with the technical system(s) linked thereto are returned. The result is a list of configurations with their associated technical systems, and a loop over the technical systems is initiated at 806.

At 808, the corresponding executed configuration for the technical system is loaded. All of these technical systems contain the attributes values that were part of the last execution. The executed configuration does not contain any information about the status and logs for their activities, as the configuration should be re-used for re-execution. A configuration to be displayed is built at 810, and displayed to the user at 812.

Figure 9:
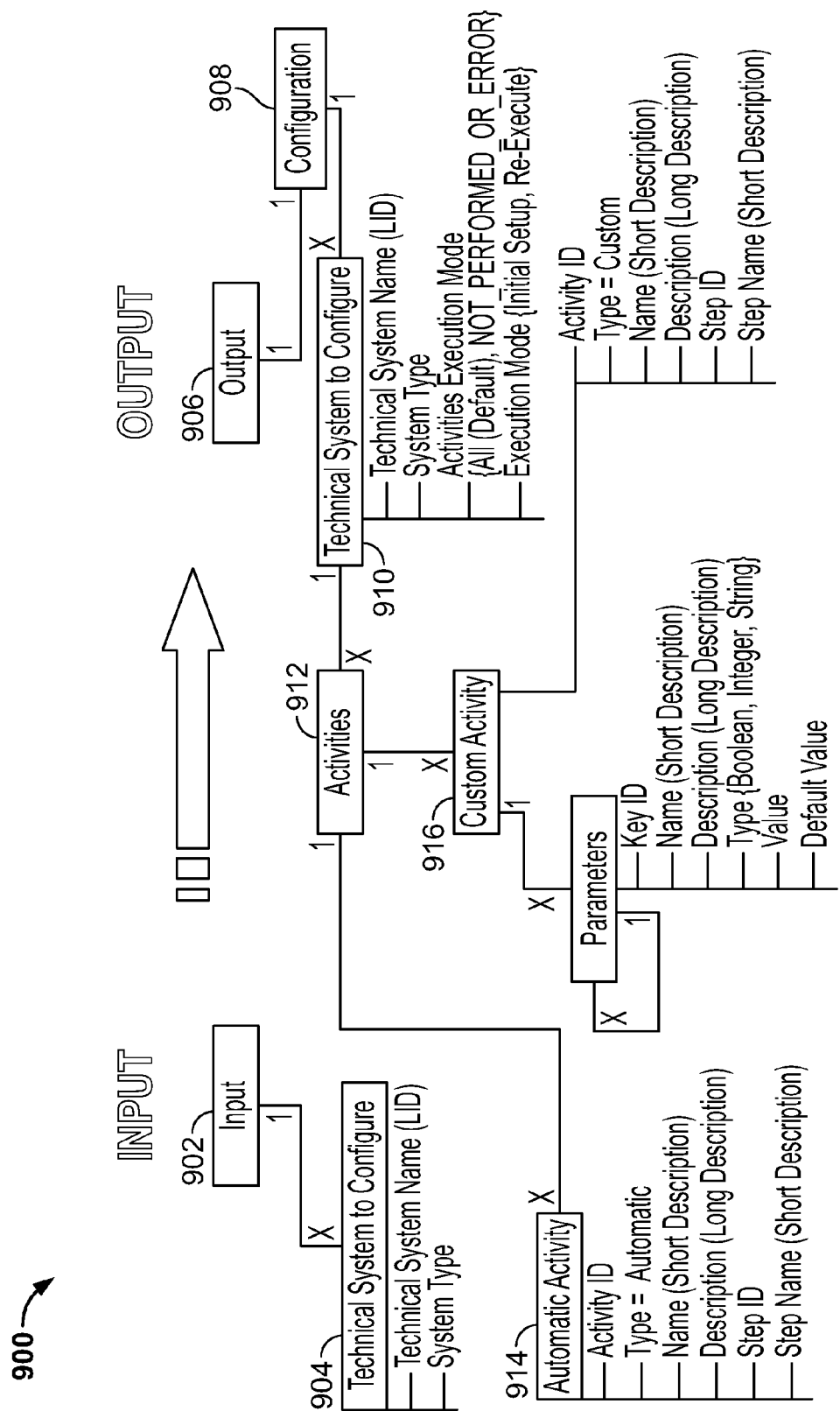
FIG. 9 shows a structure of a retrieved configuration.

FIG. 9 shows a structure 900 of a retrieved configuration. That is, if the service receives an input 902 that specifies one or more technical systems 904, then a resulting output 906 has the structure 900. For example, the technical system(s) 904 can be uniquely specified using technical system name(s) and system type(s).

In some implementations, the output 906 includes exactly one configuration 908 and identifies one or more technical systems 910 having the configuration 908. For example, the technical system(s) 910 can be uniquely specified using technical system name(s), system type(s), activities execution mode(s), and execution mode(s). Moreover, each of the identified technical systems 910 has one or more activities 912, each of which is either an automatic activity 914 or a custom activity 916. Each of the automatic activity 914 and the custom activity 916 can include one or more steps and can be specified using the shown parameters, for example. If any of the steps in the activities 912 is such that the step should be performed exactly once for the technical system, then it is not proper to include the step(s) in the reconfiguration. For this reason, one or more steps can be omitted or rendered non-visible in the output 906.

Figure 10:
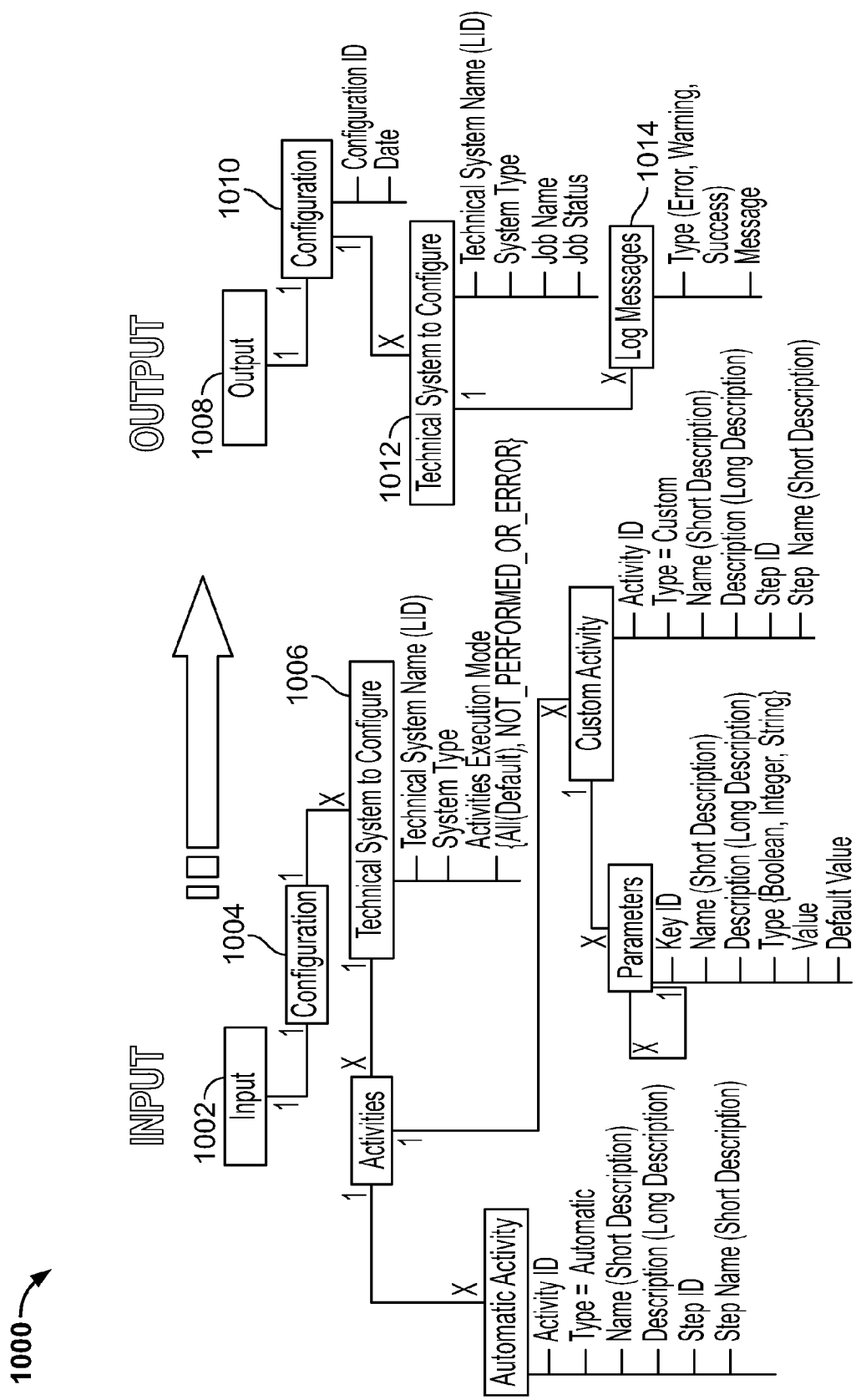
FIG. 10 shows a structure of a configuration for a technical system.

FIG. 10 shows a structure 1000 of a configuration for a technical system. That is, if the service receives an input 1002 that specifies a configuration 1004 for one or more technical systems 1006, then the service generates an output 1008 to the configuration manager. The structure 1000 essentially corresponds to the structure 900 (FIG. 9) that was generated based on retrieving the existing configurations.

The output 1008, in turn, includes one configuration 1010 which applies to one or more technical systems 1012 to be configured. The output 1008 can also include log messages 1014. The output 1008 defines a configuration that can be forwarded to the customer's configuration manager when the service requests that the mass configuration be executed. For example, the defined configuration can be included in an execute configuration communication from the service.

Figure 11:
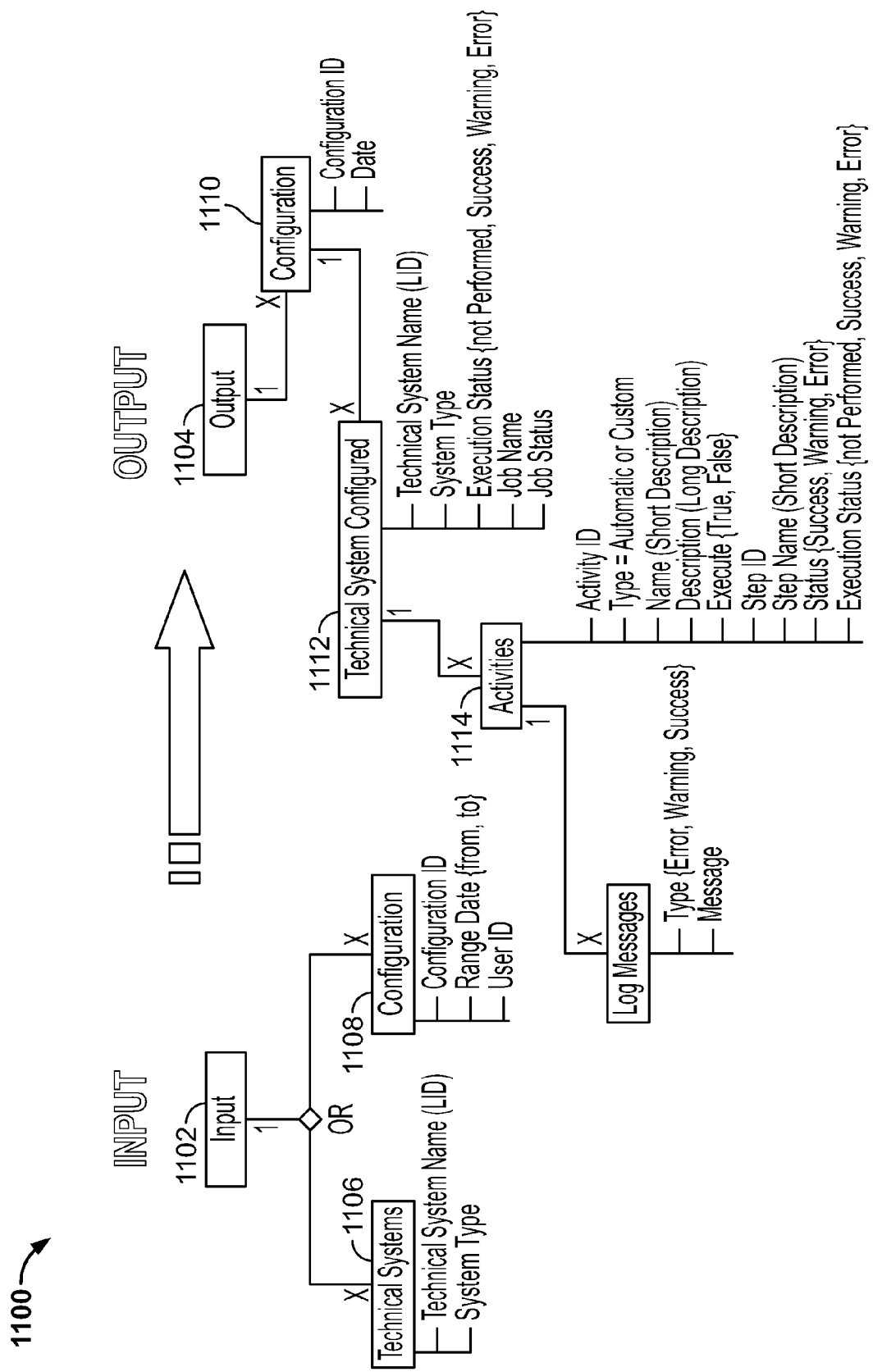
FIG. 11 shows a structure of an obtained status and log.

FIG. 11 shows a structure 1100 of an obtained status and log. That is, if the service receives an input 1102 requesting a status and log, then an output 1104 having the structure 1100 is generated. The input 1102 can specify one technical system 1106 or a configuration 1108. That is, the technical system 1106 requests the status and log for a particular technical system (which may have been subject to more than one configuration), while the configuration 1108 requests the status and log for a particular configuration (which may have involved more than one technical system).

The output 1104 includes one or more configurations 1110 for one or more technical system 1112. Each technical system 1112 is associated with one or more activities 1114, and each activity is specified as to its identity and type, etc., and also by one or more steps.

Figure 12:
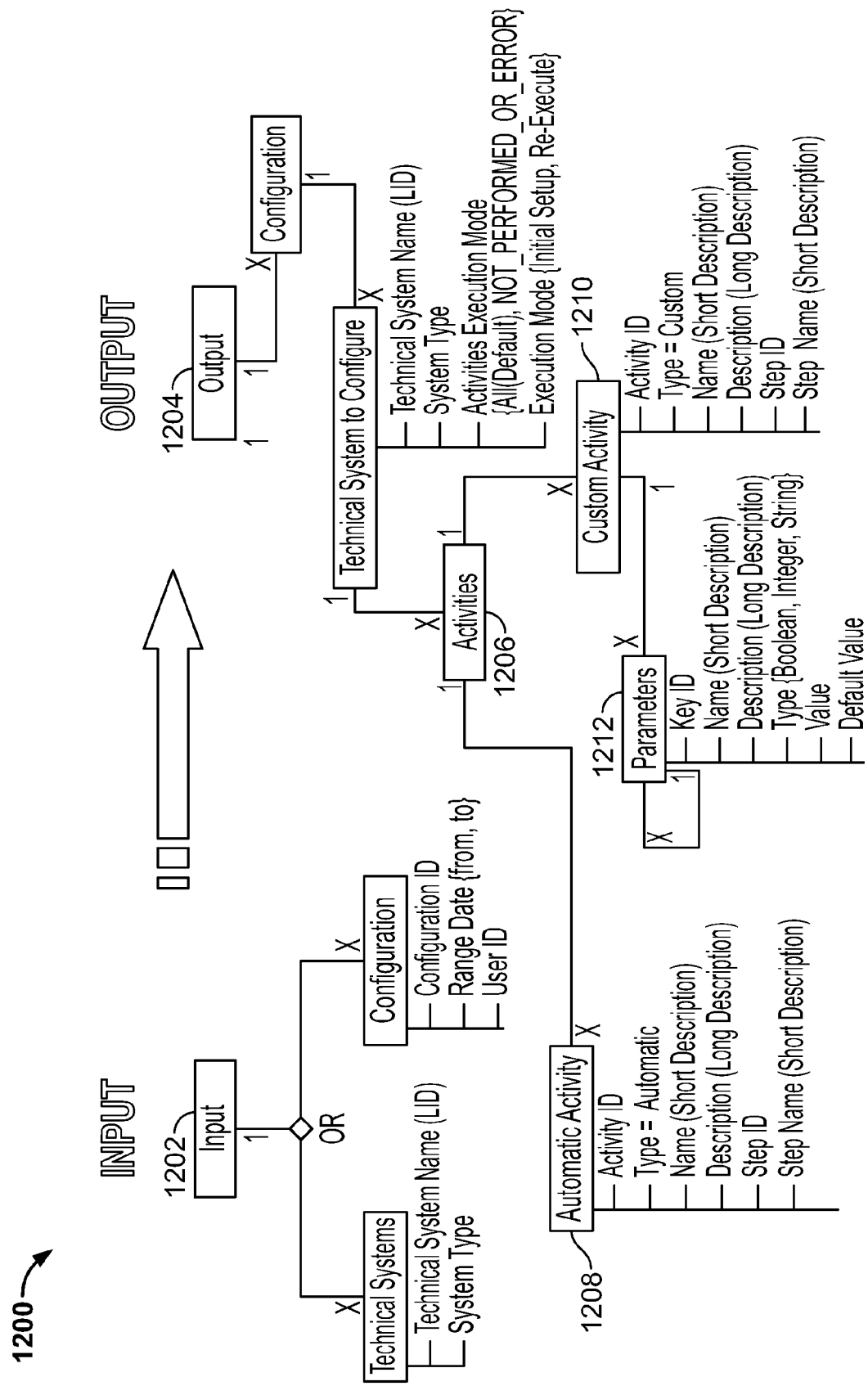
FIG. 12 shows a structure of a retrieved executed configuration.

FIG. 12 shows a structure 1200 of a retrieved executed configuration. That is, if the service receives an input 1202 requesting an executed configuration, then an output 1204 having the structure 1200 is generated. The input 1202 can have a structure similar to the input 1102 (FIG. 11). The output 1204 can have a structure similar to the output 1104 (FIG. 11), except that each activity 1206 is either an automatic activity 1208 or a custom activity 1210. Each custom activity 1210 can have one or more parameters 1212. The output 1204 defines one or more executed configurations requested by the service.

Figure 13:
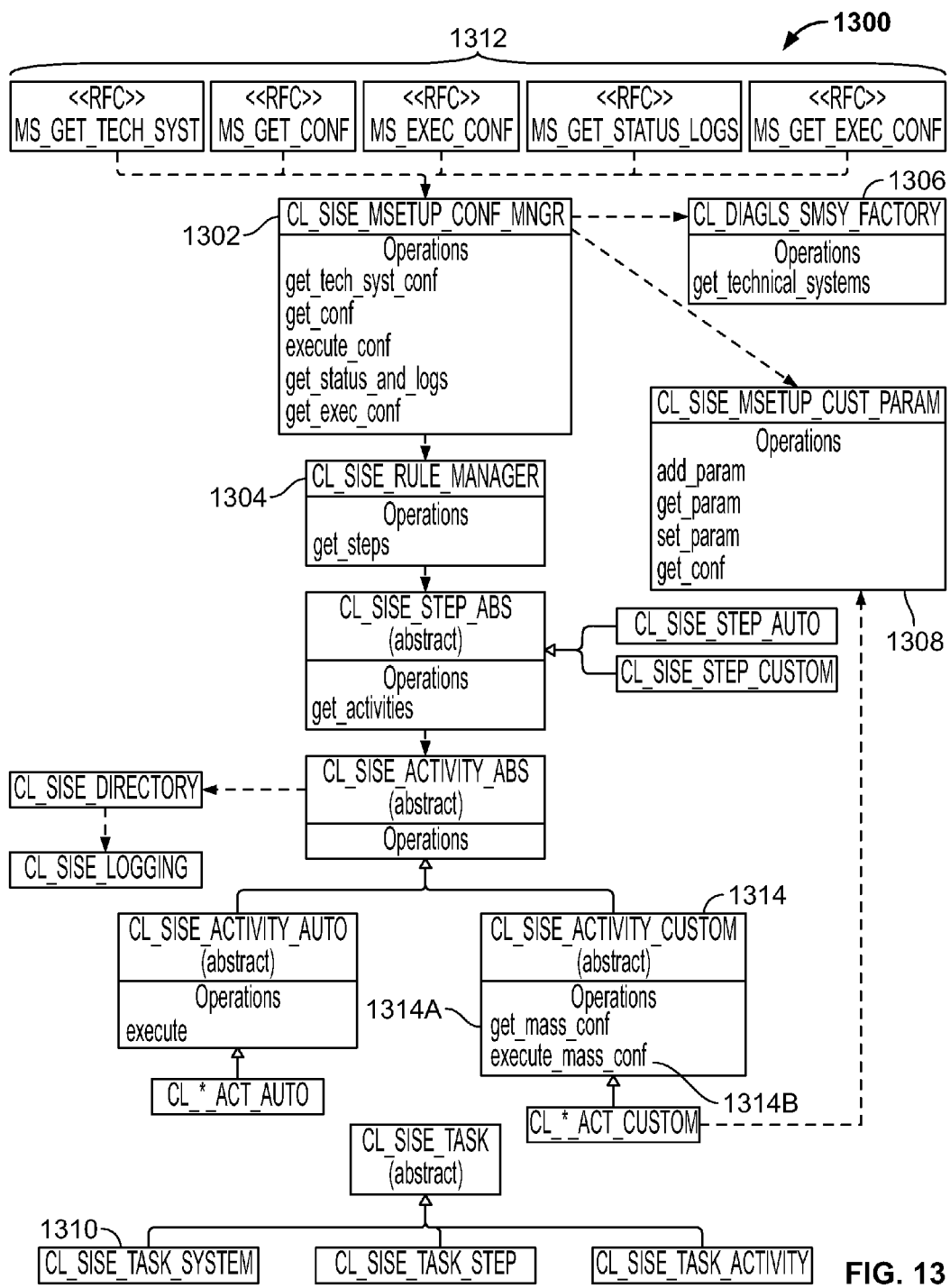
FIG. 13 shows a class diagram for mass configuration of technical systems.

FIG. 13 shows a class diagram 1300 for mass configuration of technical systems. The class diagram maps semantic definition as described in earlier examples, and shows how a mass setup configuration can be integrated into an existing architecture. A class 1302 called CL_SISE_MSETUP_CONF_M-NGR is an entry point for mass setup configuration. It will be instantiated by the corresponding function module in charge of performing the mass setup operation. This function module is called from the mapped (web) service operation. The class 1302 should use a class 1304 called CL_SISE_RULE_MANAGER to load the scenario(s) and the corresponding step definition(s) from database.

A class 1306 called CL_DIAGLS_SMSY_FACTORY is used to read the landscape data definition of the customer's system. For example, this class may already exist in the landscape architecture for use in non-mass configuration.

Components of the class diagram 1300 that are designed for delivering mass setup configuration include:

The class 1302;

A class 1308 called CL_SISE_MSETUP_CUST_PARAM;

A class 1310 called CL_SISE_TASK_SYSTEM; and

Function modules 1312 called, respectively: MS_GET_TECH_SYST, MS_GET_CONF, MS_EXEC_CONF, MS_GET_STATUS_LOGS and MS_GET_EXEC_CONF.

A class CL_SISE_ACTIVITY_CUSTOM comprises methods, including:

A method 1314A called get_mass_conf which is implemented by a corresponding class to return the configuration requested. A reference to the class 1308 can be returned which contains the list of parameters in the configuration for this custom activity; and A method 1314B called execute_mass_conf which is implemented by a corresponding class to execute the mass setup configuration. Parameters are received from a reference to the class 1308 including values used for the configuration.

During execution, each configuration of one technical system can start asynchronously. This task is managed by the class 1310 linked to each new job. The same or similar logic is in place for execution of automatic steps or activities.

Figure 14:
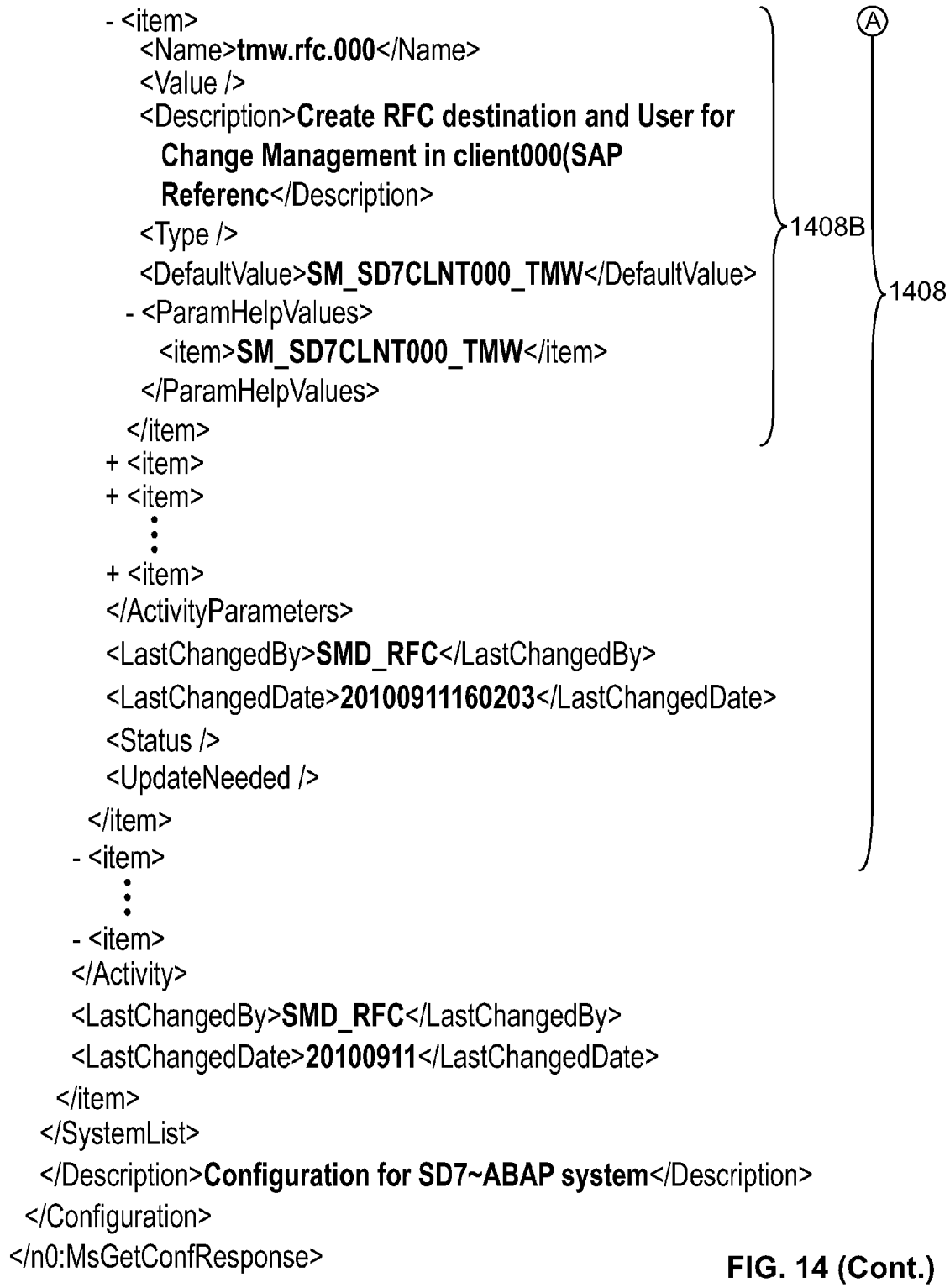
FIG. 14 shows XML code for a retrieved configuration.

FIG. 14 shows XML code 1400 for a retrieved configuration. The code 1400 here includes:

Metadata 1402 about the configuration (omitted here for brevity). Such metadata can include, but is not limited to, configuration identifier, creation date, date of last change, name of the responsible person, name of the person who made the last change, and a language code;

A name and type 1404 of a technical system;

Multiple activity items 1406 and 1408;

For an activity item, one or more steps 1406A, including an identifies and a step description;

For an activity item, one or more activity parameters, with one or more parameter items 1408B.

Figure 15:
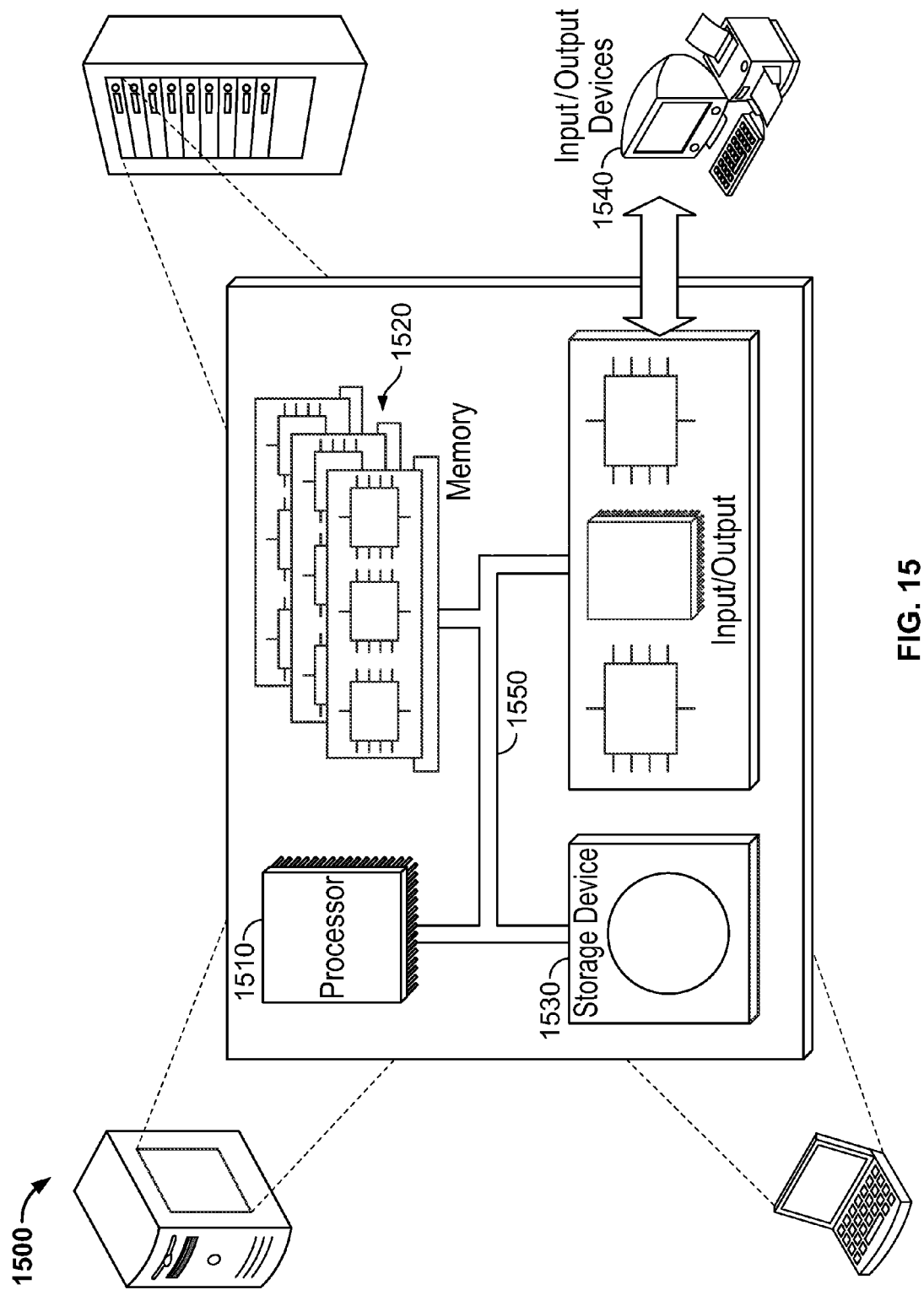
FIG. 15 is a block diagram of a computing system that can be used in connection with computer-implemented methods described in this document.

FIG. 15 is a schematic diagram of a generic computer system 1500. The system 1500 can be used for the operations described in association with any of the computer-implement methods described previously, according to one implementation. The system 1500 includes a processor 1510, a memory 1520, a storage device 1530, and an input/output device 1540. Each of the components 1510, 1520, 1530, and 1540 are interconnected using a system bus 1550. The processor 1510 is capable of processing instructions for execution within the system 1500. In one implementation, the processor 1510 is a single-threaded processor. In another implementation, the processor 1510 is a multi-threaded processor. The processor 1510 is capable of processing instructions stored in the memory 1520 or on the storage device 1530 to display graphical information for a user interface on the input/output device 1540.

The memory 1520 stores information within the system 1500. In some implementations, the memory 1520 is a computer-readable medium. The memory 1520 is a volatile memory unit in some implementations and is a non-volatile memory unit in other implementations.

The storage device 1530 is capable of providing mass storage for the system 1500. In one implementation, the storage device 1530 is a computer-readable medium. In various different implementations, the storage device 1530 may be a floppy disk device, a hard disk device, an optical disk device, or a tape device.

The input/output device 1540 provides input/output operations for the system 1500. In one implementation, the input/output device 1540 includes a keyboard and/or pointing device. In another implementation, the input/output device 1540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for mass configuring technical systems, the method comprising:
   receiving, in a central system connected to multiple systems, a call for mass configuration of technical systems, the call associated with a configuration manager and being generated from a first system of multiple systems, each system including multiple technical systems configured using a corresponding instance of the configuration manager, wherein configuration parameters for the first system are distributed between the corresponding instance and the technical systems;
   retrieving by the central system, from the corresponding instance of the configuration manager and in response to the call, identifiers for a plurality of the technical systems in the first system;
   retrieving by the central system, from the corresponding instance of configuration manager and from the plurality of technical systems, configurations for the plurality of technical systems; and
   forwarding, by the central system, an execute configuration communication to the corresponding instance of the configuration manager, the execute configuration including at least one parameter that has been changed from the retrieved configurations;
   wherein the corresponding instance of the configuration manager determines, based on activities required to perform the execution configuration, that the technical systems are to be mass configured, and wherein, based on the determination and the received execute configuration communication, the corresponding instance of the configuration manager mass configures the plurality of technical systems in the first system by configuring each of the plurality of technical systems in parallel;
   wherein the plurality of technical systems are also capable of being sequentially configured in a non-mass configuration process by the corresponding instance of the configuration manager in a case that it is determined that the technical systems are not to be mass configured based on activities required to perform the execution configuration.

2. The computer-implemented method of claim 1, wherein each of the systems has defined therein an application for generating a corresponding version of the call.

3. The computer-implemented method of claim 1, further comprising defining the plurality of technical systems by filtering all technical systems in the first system.

4. The computer-implemented method of claim 1, wherein those parameters of the configurations corresponding to custom activities are retrieved from the instance of the configuration manager, and wherein others of the parameters of the configurations corresponding to automatic activities are retrieved from respective ones of the plurality of technical systems.

5. The computer-implemented method of claim 1, further comprising retrieving a configuration execution status from the instance of the configuration manager in the first system after forwarding the execute configuration communication.

6. The computer-implemented method of claim 1, further comprising retrieving an executed configuration from the instance of the configuration manager in the first system after forwarding the execute configuration communication.

7. The computer-implemented method of claim 1, wherein the configurations are retrieved using at least an XML file, and wherein in the execute configuration communication the XML file has been reduced to only the at least one parameter that has been changed.

8. A computer program product embodied in a non-transitory computer-readable storage medium and comprising instructions that when executed by a processor perform a method for mass configuring technical systems, the method comprising:
   receiving, in a central system connected to multiple systems, a call for mass configuration of technical systems, the call associated with a configuration manager and being generated from a first system of multiple systems, each system including multiple technical systems configured using a corresponding instance of the configuration manager, wherein configuration parameters for the first system are distributed between the corresponding instance and the technical systems;
   retrieving by the central system, from the corresponding instance of the configuration manager and in response to the call, identifiers for a plurality of technical systems in the first system;
   retrieving by the central system, from the corresponding instance of the configuration manager and from the plurality of technical systems, configurations for the plurality of technical systems; and
   forwarding, by the central system, an execute configuration communication to the corresponding instance of the configuration manager, the execute configuration including at least one parameter that has been changed from the retrieved configurations;
   wherein the corresponding instance of the configuration manager determines, based on activities required to perform the execution configuration, that the technical systems are to be mass configured, and wherein, based on the determination and the received execute configuration communication, the corresponding instance of the configuration manager mass configures the plurality of technical systems in the first system by configuring each of the plurality of technical systems in parallel;
   wherein the plurality of technical systems are also capable of being sequentially configured in a non-mass configuration process by the corresponding instance of the configuration manager in a case that it is determined that the technical systems are not to be mass configured based on activities required to perform the execution configuration.

9. The computer program product of claim 8, wherein each of the systems has defined therein an application for generating a corresponding version of the call.

10. The computer program product of claim 8, further comprising defining the plurality of technical systems by filtering all technical systems in the first system.

11. The computer program product of claim 8, wherein those parameters of the configurations corresponding to custom activities are retrieved from the instance of the configuration manager, and wherein others of the parameters of the configurations corresponding to automatic activities are retrieved from respective ones of the plurality of technical systems.

12. The computer program product of claim 8, further comprising retrieving a configuration execution status from the instance of the configuration manager in the first system after forwarding the execute configuration communication.

13. The computer program product of claim 8, further comprising retrieving an executed configuration from the instance of the configuration manager in the first system after forwarding the execute configuration communication.

14. The computer program product of claim 8, wherein the configurations are retrieved using at least an XML file, and wherein in the execute configuration communication the XML file has been reduced to only the at least one parameter that has been changed.

15. A system comprising:
at least one processor; and
a non-transitory computer readable medium including instructions that when executed by the processor generate a service comprising:
receiving, in the system, a call for mass configuration of technical systems, the call associated with a configuration manager and being generated from a first system of multiple systems, each system including multiple technical systems configured using a corresponding instance of the configuration manager, wherein configuration parameters for the first system are distributed between the corresponding instance and the technical systems;
retrieving by the system, from the corresponding instance of the configuration manager and in response to the call, identifiers for a plurality of technical systems in the first system;
retrieving by the system, from the corresponding instance of the configuration manager and from the plurality of technical systems, configurations for the plurality of technical systems; and
forwarding by the system an execute configuration communication to the corresponding instance of the configuration manager, the execute configuration including at least one parameter that has been changed from the retrieved configurations;
wherein the corresponding instance of the configuration manager determines, based on activities required to perform the execution configuration, that the technical systems are to be mass configured, and wherein, based on the determination and the received execute configuration communication, the corresponding instance of the configuration manager mass configures the plurality of technical systems in the first system by configuring each of the plurality of technical systems in parallel;
wherein the plurality of technical systems are also capable of being sequentially configured in a non-mass configuration process by the corresponding instance of the configuration manager in a case that it is determined that the technical systems are not to be mass configured based on activities required to perform the execution configuration.

16. The system of claim 15, wherein each of the systems has defined therein an application for generating a corresponding version of the call.

17. The system of claim 15, further comprising defining the plurality of technical systems by filtering all technical systems in the first system.

18. The system of claim 15, wherein those parameters of the configurations corresponding to custom activities are retrieved from the instance of the configuration manager, and wherein others of the parameters of the configurations corresponding to automatic activities are retrieved from respective ones of the plurality of technical systems.

19. The system of claim 15, further comprising retrieving a configuration execution status from the instance of the configuration manager in the first system after forwarding the execute configuration communication.

20. The system of claim 15, further comprising retrieving an executed configuration from the instance of the configuration manager in the first system after forwarding the execute configuration communication.

21. The system of claim 15, wherein the configurations are retrieved using at least an XML file, and wherein in the execute configuration communication the XML file has been reduced to only the at least one parameter that has been changed.

* * * * *